United States Patent

Kinjo et al.

[15] 3,646,261

[45] Feb. 29, 1972

[54] MAGNETIC RECORDING AND REPRODUCING SYSTEM

[72] Inventors: Hisao Kinjo, Yokohama; Seiichi Takashima, Kamakura; Takatoshi Kato, Tokyo; Yoshitaka Iwabuchi, Yokohama; all of Japan

[73] Assignee: Victor Company of Japan, Limited, Yokohama, Japan

[22] Filed: Apr. 28, 1969

[21] Appl. No.: 819,846

[30] Foreign Application Priority Data

Apr. 30, 1968 Japan....................................43/28523

[52] U.S. Cl.................................178/6.6 DD, 179/100.2 CA

[51] Int. Cl..........................................H04n 5/78, G11b 5/48

[58] Field of Search..........178/6.6 A, 6.6 D, 6.6 FS, 100.2 T, 178/100.2 CA, 6.6 CA; 340/174.1 C; 179/100.2 T

[56] References Cited

UNITED STATES PATENTS

| | | | |
|---|---|---|---|
| 2,914,752 | 11/1959 | MacDonald | 340/174.1 X |
| 3,009,759 | 11/1961 | Johnson et al. | 340/174.1 |
| 3,539,716 | 11/1970 | Stratton et al. | 178/6.6 |

OTHER PUBLICATIONS

Publication I– " Reviewing Slow Motion Principles," Broadcast Engineering, 2/28/69, p. 14– 18

*Primary Examiner*—Stanley M. Urynowicz, Jr.
*Assistant Examiner*—Steven B. Pokotilow
*Attorney*—Louis Bernat

[57] ABSTRACT

This is a system for magnetically recording and playing back video signals on a rotating disc-shaped or drum-shaped magnetic medium. A plurality of magnetic heads move alternately and intermittently in a predetermined cycle. The invention permits detection of feed initiation positions, feed completion positions, feed burst positions and feed reset positions of the magnetic heads.

4 Claims, 3 Drawing Figures

INVENTORS
HISAO KINJO
SEIICHI TAKASHIMA
TAKATOSHI KATO
YOSHITAKA IWABUCHI

BY

ATTORNEY

INVENTORS
HISAO KINJO
SEIICHI TAKASHIMA
TAKATOSHI KATO
YOSHITAKA IWABUCHI

BY

ATTORNEY

MAGNETIC RECORDING AND REPRODUCING SYSTEM

The present invention relates to magnetic recording and reproducing systems, and more particularly to an apparatus for magnetically recording and playing back video signals on a rotating disc-shaped or drum-shaped magnetic medium.

The invention uses a plurality of magnetic heads which are adapted to move alternately and intermittently in a predetermined cycle. The inventive system enables a detection of the feed-initiating positions, feed completion positions, feed burst positions, and feed reset positions of the magnetic heads. The system provides a high degree of accuracy by means of a simple construction.

The magnetic heads of this apparatus bring about a magnetic recording and playback by linearly moving a plurality of magnetic heads, such as two magnetic heads, for example. The apparatus uses either a disc-shaped or a drum-shaped rotary magnetic medium. If the heads are used in such a system, it is necessary to detect when the heads are in the feed initiation position, feed completion position, feed burst position, and the like.

In magnetic recording and reproducing apparatus of this type, it is necessary to detect the position of each magnetic head with high accuracy wherein the maximum error is in the order of ±100 microns. Otherwise, it is not possible to effect accurate tracking on the magnetic medium. More particularly, it is necessary to detect the reversing position for each magnetic head, with a high degree of accuracy, in apparatus using the so-called endless recording and playback. In this kind of apparatus, each magnetic head moves in a direction which is reversed at the inner peripheral position and the outer peripheral portion.

The prior art apparatus of the described type have had a disadvantage in that it is impossible for them to accurately detect the feed positions of the magnetic heads. The present invention overcomes the aforementioned disadvantages of the prior art apparatus.

An object of the present invention is to provide a magnetic recording and reproducing system which permits an accurate detection of the feed positions of the magnetic heads. Here, an object is to avoid increasing the mechanical precision of the apparatus.

Another object of the invention is to provide a magnetic recording and reproducing apparatus which permits an electronic detection of the feed positions of the magnetic heads with high accuracy. Here an object is to detect the positions of the magnetic heads along the length and in the axial direction of the rotary shafts used for feeding the magnetic heads. Another object is the detection of the rotational angular position of the rotary shafts.

Still another object of the invention is to provide a magnetic recording and reproducing apparatus which enables a detection of the accurate feed positions of the magnetic heads. More particularly, an object is to locate the head position in the so-called endless magnetic recording and reproducing apparatus. In this connection, an object is to cause a plurality of magnetic heads to reverse their direction of movement at the inner peripheral portion and the outer peripheral portion of the rotary magnetic medium.

Additional objects, as well as features and advantages, of the invention will become more apparent from the description set forth hereinafter when considered in conjunction with the accompanying drawings, in which.

Figure 1:
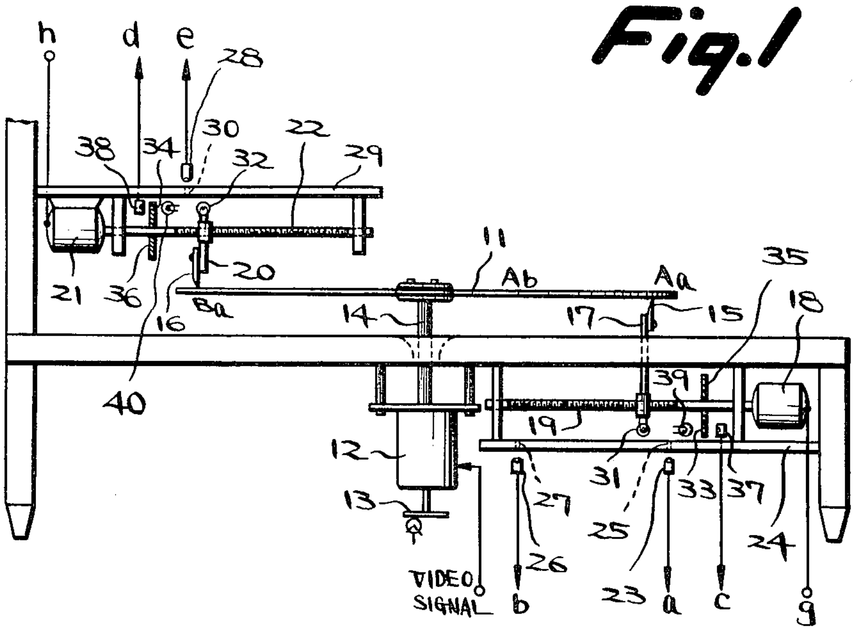
FIG. 1 is a schematic side elevation view of one embodiment of the magnetic recording and reproducing apparatus in the system to which this invention can be applied.

A system, according to this invention, which attains the aforesaid objects will now be explained with reference to the drawings.

A driving means for a magnetic head in a magnetic tape recorder to which this invention is applied is fully described in an application filed Dec. 5, 1967 and identified by the Ser. No. 688,201. Accordingly, this driving means is only briefly described herein.

In the drawings, a magnetic medium or magnetic disc 11 is formed by applying a coating of a magnetizing material on the opposite sides of a disc base 11. This disc has a substantial thickness. An alternative involves laminating two magnetic discs by interposing a cushion material therebetween. The opposite magnetized surfaces of the magnetic discs are directed outwardly. Accordingly, the magnetic medium 11 has recording and reproducing faces on its upper and lower surfaces. The magnetic disc 11 is rotated by a synchronous motor 12 which is synchronized by means of the vertical synchronizing signal in the video signal. To enable the present invention to be better understood, the operation of the synchronous motor will be explained, although no block diagram is presented herein.

A video signal is supplied first to a known sine wave generator which separates the vertical synchronizing signal from said video signal. A sine wave voltage is produced in synchronism with the vertical synchronizing signal. The sine wave voltage is amplified by a disc motor drive amplifier, and then it is supplied to the magnetic disc rotating synchronous motor 12. As a result, the magnetic disc 11 rotates at a rate of 30 revolutions per second, for example. This rate corresponds to one frame of the video signal.

A known tone wheel 13 is mounted on the rotor shaft of the synchronous motor 12. As this wheel turns with the motor, it produces a series of pulses in a cycle of one frame. These pulses are supplied to various control circuits. For example, these pulses are supplied to a gating signal producing circuit (not shown), which produces gating signals that are synchronous with the pulses. These pulses are then supplied to each magnetic head to be recorded or reproduced as switching signals.

Then, a video signal is recorded on or reproduced from opposite faces of the magnetic disc 11 as it is rotated by the synchronous motor 12. This is done by magnetic recording an reproducing heads 15 and 16 disposed on opposite sides of the disc 11 and in positions which are diametrically opposed to each other, on opposite sides of a center shaft 14. The first magnetic recording and reproducing head 15 is firmly fixed to the upper portion of a head support 17. The lower portion of the head support 17 is threadably engaged by a feed screw 19. This shaft is directly connected to the rotor shaft of a first pulse or stepping motor 18. The second magnetic recording and reproducing head 16 is firmly fixed to the lower portion of a head support 20. The upper portion of this head support 20 is threadably engaged by a feed screw 22 which is directly connected to the rotor shaft of a second pulse or stepping motor 21.

Figure 2:
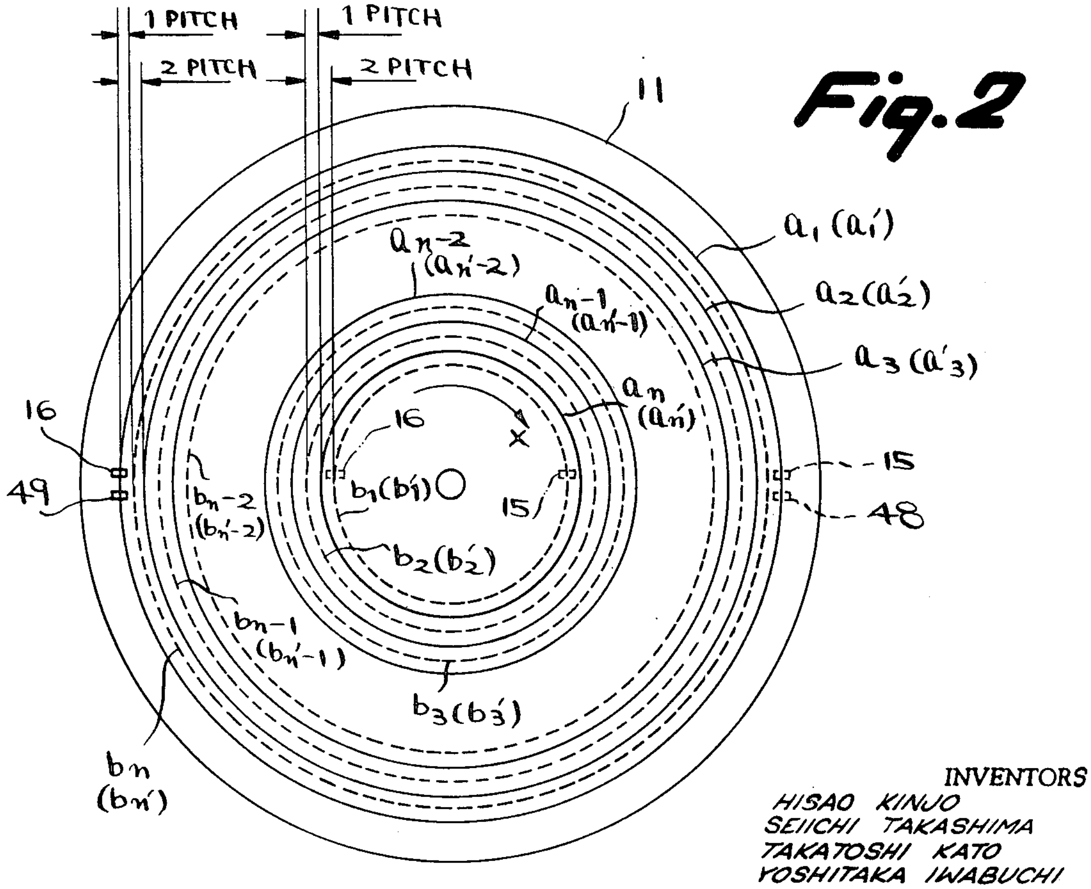
FIG. 2 is a diagram showing the track pattern on a magnetic disc-shaped medium used on the apparatus of FIG. 1.

The two feed screws 19 and 22 are intermittently rotated by the pulse or stepping motors 18 and 21, respectively. The magnetic heads 15 and 16 are thereby intermittently moved linearly from the outer peripheral portion of the disc toward the inner peripheral portion thereof, or vice versa. The magnetic heads 15 and 16 form annular concentric tracks on opposite sides of the magnetic disc 11, as shown in FIG. 2. To reverse the direction of the intermittent movement of each of the magnetic heads 15 and 16, the direction of rotation of each of the pulse motors 18 and 21 is reversed.

The "rotational angle" of each of the pulse motors 18 and 21 is the angle of rotation taken by the rotor shaft responsive to each input pulse. Each step of intermittent rotation is selected to be 15 degrees. Thus, each of the magnetic heads 15 and 16 is moved on the magnetic disc 11 by a distance which corresponds to two track pitches. This movement occurs in four steps responsive to the intermittent rotation of the motors; or, the head so-moves after each rotor shaft has rotated through an angle of 60°.

Accordingly, each of the magnetic heads is moved, by a distance which corresponds to two track pitches, responsive to four pulses and by a distance corresponding to one track pitch responsive to two pulses. It should be understood that an apparatus of high accuracy and precision may be provided in which the error of track pitches of the magnetic heads is minimized. An increase in the number of pitches of the feed screws 19 and 22 may be made by fine machining finishes. An increase in the number of steps of intermittent rotation of the pulse motors 18 and 21 may be made for moving the magnetic heads a distance corresponding to one track pitch.

More specifically, it is possible to provide an apparatus of higher accuracy if six pulses ($15° \times 6 = 90°$) are used to cause each of the magnetic heads 15 and 16 to move a distance corresponding to one track pitch when each of the pulse motors 18 and 21 rotates through an angle of 90°. The error of the rotational pitch angle of a pulse motor is reduced by an inverse proportion to the number of pulses.

If a pulse motor has a maximum respondable pulse frequency of 1,000 p.p.s., the response time of one step for one pulse is very short. It is possible to control the one step angle within 2 milliseconds, to thereby cause the motor to start and stop.

A phototransistor 23 is used for detecting the movement to the initiation position by the first magnetic head 15. This transistor is mounted in a lower position which corresponds to the movement of the first magnetic head to an initiation position Aa. The transistor is disposed against an opening 25 of small diameter formed in a first baseplate 24. A second phototransistor 26 is deployed for detecting the reversing position of the first magnetic head 15. This transistor is mounted in a lower position corresponding to the feed completion and reversing position Ab of the magnetic head 15. It is disposed against an opening 27 of small diameter formed in said first baseplate 24. A phototransistor 28 is provided for detecting the movement of the second magnetic head 16 to the initiation position. The reversing position is mounted to correspond to the movement initiation position B*a* of the second magnetic head 16. The transistor 28 for detecting this position is disposed against an opening 30 of small diameter which is formed in a second baseplate 29.

A lamp 31 is mounted at the lower end of the head support 17. The phototransistors 23 and 26 receive light through the openings 25 and 27, respectively. Thus, the light beam emitted by the light source lamp 31 is detected when the lamp is in the positions A*a* and A*b*, respectively. Upon detection of the light 31 at either of these positions, the corresponding phototransistor produces a detection output signal. A lamp 32 is mounted on the upper end of the head support 20. The phototransistor 28 receives light through the opening 30 when the light beam emitted by the light source lamp 32 is in the position B*a*. Upon detection of light in this position, the phototransistor 28 produces a detection output signal.

Rotary plates 35 and 36 are formed with openings 33 and 34 of small diameter. These plates are mounted on and rotate as a unit with the feed screws 19 and 22, respectively. Rotation position detection phototransistors 37 and 38 and light source lamps 39 and 40 are mounted in face-to-face relation, respectively. The rotary plates 35 and 36 are interposed between them, respectively.

Each of the openings 25, 27, 30, 33, and 34 has a diameter of about 0.6 millimeter. The distance between the center of the rotary plates 35 and 36 and the small openings 33 and 34, respectively, is about 20 millimeters.

The phototransistors 37 and 38 receive the light beam emitted by the lamps 39 and 40, respectively. Each transistor 37, 38 produces a detection output signal when the small openings 33 and 34 of the rotary plates 35 and 36 are in line with the phototransistors 37 and 38 and the lamps 39 and 40, respectively. Since the rotary plates 35 and 36 are mounted on the feed screws 19 and 22, respectively, the small openings 33 and 34 are positioned on the line connecting the lamps 39 and 40 with the phototransistors 37 and 38 when the feed screws 19 and 22 have rotated through a predetermined rotational angle.

Figure 3:
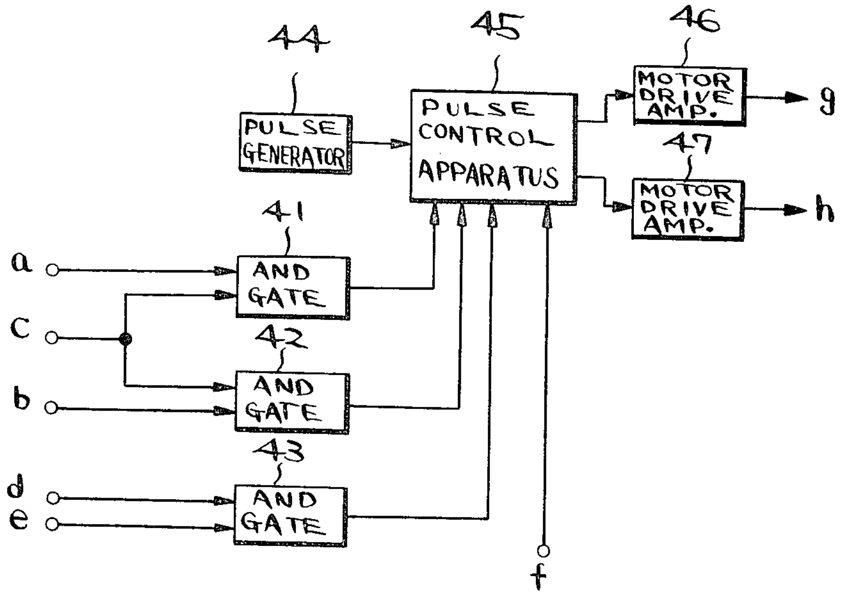
FIG. 3 is a block diagram of the control circuit for the apparatus of FIG. 1.

The output signals produced by the phototransistors 23 and 26 are supplied to AND-gate circuits 41 (FIG. 3) and 42 via the output terminals *a* and *b*, respectively. At the same time, the output signal of the phototransistor 37 is supplied to the AND-gate circuits 41 and 42 via an output terminal *c*. The outputs of the phototransistors 28 and 38 are supplied to an AND-gate circuit 43 via output terminals *d* and *e*, respectively. Each of the AND-gates 41, 42, and 43 produces an output signal.

The output signals of the AND gates are supplied to a pulse motor control device 45, which controls pulses from a pulse generator 44. This pulse generator is enabled or inhibited responsive to control pulses supplied through an external terminal *f*. The pulse motors 18 and 21 are caused to reverse their direction of motion or to stop, for example, responsive to the output signals of the pulse motor control device 45.

More specifically, pulses from the pulse generator 44 are controlled by pulses from the external terminal *f* and supplied to a first pulse motor drive amplifier 46 and a second pulse motor drive amplifier 47, respectively. The output signals of these amplifiers 46 and 47 are supplied to the pulse motors 18 and 21 through the terminals *g* and *h*, respectively. The pulse motors 18 and 21 may operate and rotate in either direction responsive to these output signals.

FIG. 2 shows the track pattern formed on the magnetic disc 11. One field or one frame of a video signal is recorded by the first magnetic head 15 on a track $a_1$. This track may be recorded on the underside of the magnetic disc 11, while it is rotating in the direction of arrow X. Then, the current carrying the signal to be recorded is switched to the second magnetic head 16, which forms a track $a_1$ on the upper surface of the magnetic disc 11.

The first magnetic head 15 is thus moved, from the track $a_1$ in toward the center of the disc to a position which is spaced apart from track $a_1$ by a distance corresponding to two track pitches. The second magnetic head 16 performs a recording operation while head 15 steps inwardly. As soon as the second magnetic head 16 forms the track $a_1$ on the disc 11, the current carrying the signal to be recorded is switched to the first magnetic head 15 which forms a second track $a_2$. Similarly, the second magnetic head 16 is stepped inwardly to a new position while the track $a_2$ is being recorded by the first magnetic head 15. As soon as the track $a_2$ is completed, this cycle is repeated. So the tracks $a_3$ ($a_{3'}$ ) ... $a_{n-1}$ ($a_{n'-1}$), $a_n$ ($a_{n'}$ ) are formed successively from the outer peripheral portion toward the inner peripheral portion of the magnetic disc 11.

When the magnetic heads 15 and 16 are on the magnetic tracks $a_1$ ($a_{1'}$ ) ... $a_{n-1}$ ($a_{n'-1}$), respectively, the pulse generator 44 produces four pulses. When the magnetic heads 15 and 16 reach the predetermined innermost peripheral positions, designated by tracks $a_n$ ($a_{n'}$ ), respectively, the pulse generator 44 produces two pulses.

The pulse motors 18 and 21 are constructed so that they move the magnetic heads 15 and 16 a distance corresponding to two track pitches when four pulses are applied thereto, and a distance corresponding to one track pitch then two pulses are applied thereto. Therefore, after forming tracks $a_n$ ($a_{n'}$ ), the magnetic heads 15 and 16 are moved to a position which is spaced apart from the tracks $a_n$ ($a_{n'}$ ) by a distance corresponding to one track pitch. There the heads form tracks $b_1$ ($b_{1'}$ ), respectively. While the magnetic heads are in these positions, the pulse generator 44 produces reversing control pulses, and the pulse motors 18 and 21 reverse their direction of rotation. Thereafter, the pulse generator 44 produces four pulses for each of the magnetic heads 15 and 16. This causes the magnetic heads to move a distance corresponding to two track pitches. Movement is from the inner peripheral portion toward the outer peripheral portion of the magnetic disc 11. Thereafter, the heads form tracks $b_2$ ($b_{2'}$ ) ... $b_n$ ($b_{n'}$ ), as shown in broken lines. Thus, the magnetic heads reverse the direction of their movement and continue in intermittent motion.

The tracks $b_1$ ($b_{1'}$ ) are spaced away from the tracks $a_n$ ($a_{n'}$ ) respectively, a distance corresponding to one track pitch. Thus, it should be evident from FIG. 2 that the tracks $b_2$ ($b_{2'}$ ) ... $b_n$ ($b_{n'}$ ) are formed successively from the inner peripheral portion toward the outer peripheral portion on the magnetic disc 11. The *b*-tracks are interposed between the *a*-tracks $a_1$ ($a_{1'}$) ... $a_n$ ($a_{n'}$) which were formed successively from the outer peripheral portion toward the inner peripheral portion of the magnetic disc 11, respectively.

The magnetic heads 15 and 16 continue to move successively over incremental distances corresponding to two track pitches until they reach the predetermined outer peripheral positions designated by the tracks $b_n$ ($b_{n'}$), respectively. There, the pulse generator 44 produces two pulses in the same manner as described in the previous operation. Responsive thereto, the magnetic heads 15 and 16 are moved over a distance corresponding to one track pitch to the positions designated by the tracks $a_1$ ($a_{1'}$), respectively. While the magnetic heads are in these positions, the pulse generator 44 produces reversing control pulses. These pulses cause the pulse motors 18 and 21 to reverse their rotation. Thereafter, the pulse generator 44 produces four pulses for each of the magnetic heads 15 and 16. This causes the magnetic heads to move from the outer peripheral portion toward the inner peripheral portion of the magnetic disc 11. Once again the heads form the tracks $a_2$ ($a_{2'}$), $a_3$ ($a_{3'}$) ... , respectively. The same process is repeated, and the recording operation is continued until all of the information signals that need be reproduced are recorded on the magnetic disc 11.

The magnetic heads 15 and 16 are returned from the inner peripheral portion to the outer peripheral portion of the magnetic disc 11. There, they again record signals on the tracks $a_1$ ($a_{1'}$), $a_2$ ($a_{2'}$) ... , respectively. As they do, erase magnetic heads 48 and 49 move along just ahead of the magnetic heads 15 and 16, respectively, to erase the signals already recorded on the magnetic disc 11. After the old signals have been erased, the magnetic heads 15 and 16 record new signals on the magnetic disc 11.

The operation of the embodiment will now be explained. The magnetic heads 15 and 16 record video signals on the magnetic disc 11 by alternately initiating their intermittent movement. They move from the normal movement initiation positions Aa and Ba and form the continuous tracks $a_1$, $a_{1'}$ ... $a_n$, $a_{n'}$, and $b_1$, $b_{1'}$, ... $b_n$, $b_{n'}$ on the upper and lower surfaces of the magnetic disc 11.

The first magnetic head 15 starts first from the position A*a*, and then the second magnetic head 16 starts from the position B*a*. On alternate intermittent movements toward the inner peripheral portion of the magnetic disc 11, the first magnetic head 15 forms the tracks $a_1$ ... $a_n$ and $b_1$ ... $b_n$. The second magnetic head 16 forms the tracks $a_{1'}$ ... $a_{n'}$ and $b_{1'}$ ... $b_{n'}$.

When the first magnetic head 15 reaches the feed reversing position A*b*, the phototransistor 26 receives the light beam emitted by the lamp 31 which is mounted on the lower end of the head support 17. Thus, the movement of the first magnetic head 15 produces a detection output signal. This detection output signal is supplied to the AND-gate 42 together with a detection output signal produced by the phototransistor 37. A control signal is produced by said AND-gate circuit 42 by gating the received output signals. This control signal is supplied to the pulse motor control device 45.

After the second magnetic head 16 has completed its movement, the direction of rotation of the pulse motors 18 and 21 is reversed by the output signal of the pulse motor control device 45. At the same time, the order in which the magnetic heads 15 and 16 are intermittently moved is also reversed. Thus, in moving from the inner peripheral portion toward the outer peripheral portion of the magnetic disc 11, the second magnetic head 16 starts first. Then the first magnetic head 15 starts to record on alternate intermittent movement. In this manner, the second magnetic head 16 forms the tracks $a_1$ ... $a_n$ and $b_1$ ... $b_n$ and the first magnetic head 15 forms the tracks $a_{1'}$ ... $a_{n'}$ and $b_1$ ... $b_{n'}$.

When these two magnetic heads 15 and 16 reach the start movement initiation positions Aa and Ba, respectively, the phototransistor 28 receives the light beam emitted by the lamp 32 which is mounted at the upper end of the head support 20. This indicates that the magnetic head 16 has reached the position B*a* prior to the arrival of the magnetic head 15, at the position A*a*. Thus, the phototransistor 28 produces a detection output signal.

The detection output signal is supplied to the AND-gate circuit 43 together with the detection output signal of the phototransistor 38. A control signal is produced by the AND-gate circuit 43 by gating the detection output signals supplied to the pulse motor control device 45. After the first magnetic head 15 has completed its movement, the rotational direction of the pulse motors 18 and 21 is reversed responsive to the output signal of the pulse motor control device 45. At the same time, the order in which the magnetic heads 15 and 16 are moved is also reversed. Thus, the first magnetic head 15 starts to record first. Then, the second magnetic head 16 starts to record on each alternate intermittent movement toward the inner peripheral portion of the magnetic disc 11.

It should be appreciated from the foregoing that, by reversing the direction of movement of each magnetic head and reversing the order of movement of the magnetic heads, the direction reversing positions of a plurality of magnetic heads are never displaced from predetermined positions.

It is possible to change the order of movement of the two magnetic heads in going from the outer peripheral portion toward the inner peripheral portion as compared with the order of movement of the magnetic heads in going from the inner peripheral portion toward the outer peripheral portion of the magnetic disc. Thus, it is possible to reverse the order of movement of the magnetic heads in a reverse playback operation to coincide with the order of movement of the magnetic heads in a normal playback operation. Accordingly, when the pulse motors 18 and 21 rotate in a normal direction, the first magnetic head 15 is moved ahead of the second magnetic head 16. The detection of the reverse position is effected by the phototransistor 26. When the pulse motors 18 and 21 rotate in a reverse direction, the second magnetic head 16 moves ahead of the first magnetic head 15. The detection of the reversing position is effected by the phototransistor 28.

In the system according to this invention, an approximate feed position of the magnetic head 15 is detected by a first detection means comprising the lamp 31 and the phototransistors 23 and 26. An approximate feed position of the magnetic head 16 is detected by another first detection means comprising the lamp 32 and the phototransistor 28. A more accurate feed position of the magnetic head 15 is detected by a second detection means comprising the lamp 39 and the phototransistor 37. A more accurate feed position of the magnetic head 16 is detected by second detection means comprising the lamp 40 and the phototransistor 38. When there is a coincident detection of output signals produced by the two detection means for each magnetic head, they are supplied to the AND-gate circuits 41, 42, and 43. This produces a detection of output signals for the accurate feed position.

The present invention makes it possible to detect the feed position of the magnetic head 15 or 16 with a high degree of accuracy, without increasing mechanical precision of the apparatus. While the magnetic heads 15 and 16 alternately move in intermittent motion between their outer peripheral and inner peripheral positions, the small openings 33 and 34 of the rotary plates 39 and 40, respectively, index with the line connecting the lamps 39 and 40 with the phototransistors 37 and 38, respectively. Thus, for each rotation of the rotary plates 35 and 36, each of the phototransistors 37 and 38 produces a detection output signal. However, no detection signals are produced by the phototransistors 23, 26, and 28. Thus, no output signals are produced by the AND-gate circuits 41, 42, and 43.

The accuracy with which the position is detected can be increased by increasing the distance between the small openings 33 and 34 and the axes of rotation of the rotary plates 35 and 36, respectively.

The present invention is very effective because it enables an accurate detection of the feed positions of the magnetic head 15 or 16, especially when the heads move at a slower rate.

The invention has been described in detail with reference to an embodiment using a magnetic disc. However, it is to be understood that the inventive system can be incorporated in an apparatus with a drum-shaped or belt-shaped magnetic medium. The system can have applications in an apparatus in which disc-shaped, drum-shaped and other like magnetic mediums are used simultaneously for a plurality of channels. Therefore, this invention is not limited to the specific form of the embodiment shown herein. Many changes, modifications and combinations of elements may be made without departing from the spirit and scope of the invention. Therefore, the appended claims are to be construed as covering all equivalent structures.

What we claim is:

1. A magnetic recording and reproducing system comprising a movable magnetic medium, two magnetic heads for recording and playing back signals in closed tracks on said magnetic medium, means for moving said magnetic medium past said heads at a predetermined rate, means including said magnetic heads for recording and playing back from said magnetic medium signals in a plurality of side-by-side tracks, means comprising a head support member for individually supporting each of said magnetic heads, means comprising an individually associated feed screw threadably engaged with each of said support members, drive means individually associated with each of said feed screws, each drive means comprising a pulse motor having a rotor shaft connected to the associated feed screw, means for producing control signals for controlling the rotation of the rotors of said pulse motors, means responsive to said control signals acting on said motors for alternately and intermittently moving said magnetic heads at regular intervals, first detection means for detecting the limits of the feed positions of said magnetic heads in the axial direction of the feed screws, second detection means for detecting the rotational angles of said feed screws corresponding to the limits of the feed positions of said magnetic heads, AND-gate circuit means for producing output detection signals in response to a coincident detection of output signals from said first and second detection means, and means responsive to said AND-gate detection signals for reversing the direction of the head movements.

2. The magnetic recording and reproducing system as defined in claim 1 wherein said magnetic medium is disc-shaped and said closed tracks are concentric annular rings.

3. The magnetic recording and reproducing system as defined in claim 1 wherein said magnetic medium is drum shaped.

4. The magnetic recording and reproducing system as defined in claim 1 wherein said first detection means includes two lamps respectively mounted on each of said head support members, two phototransistors disposed relative to said lamps to give signals corresponding to said limits of the feed positions of the magnetic head, and two plates each formed with a small opening and disposed between each of said phototransistors and said magnetic medium, said openings of said two plates being respectively positioned in face-to-face relationship with said phototransistors, and wherein said second detection means comprises two rotary plates each formed with a small opening and mounted on individually associated feed screws for rotation as a unit therewith, a phototransistor and a lamp in face-to-face relationship with said rotary plate being interposed therebetween so that said phototransistor and said lamp may be disposed against said small opening in the rotary plate.

* * * * *